UNITED STATES PATENT OFFICE.

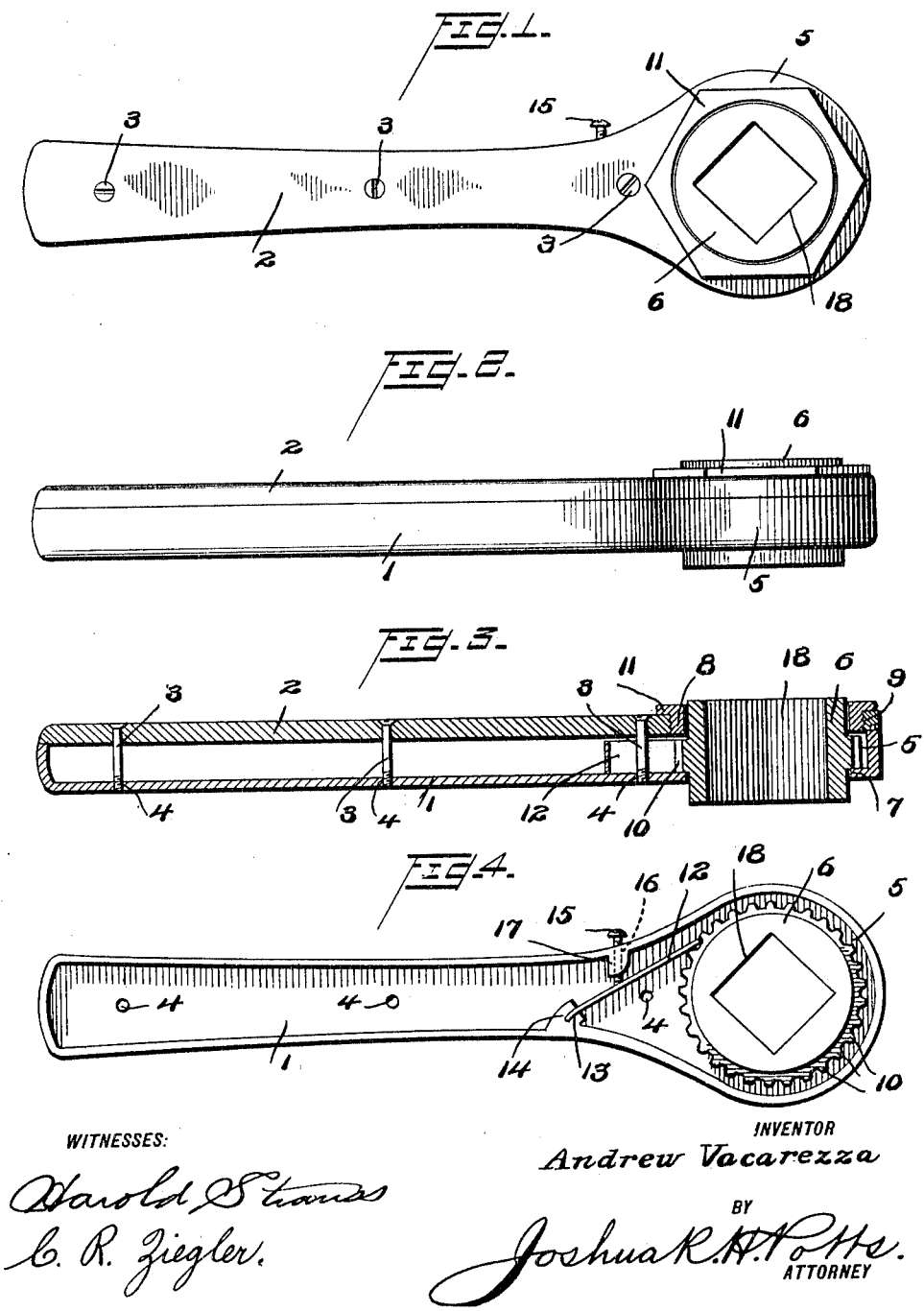

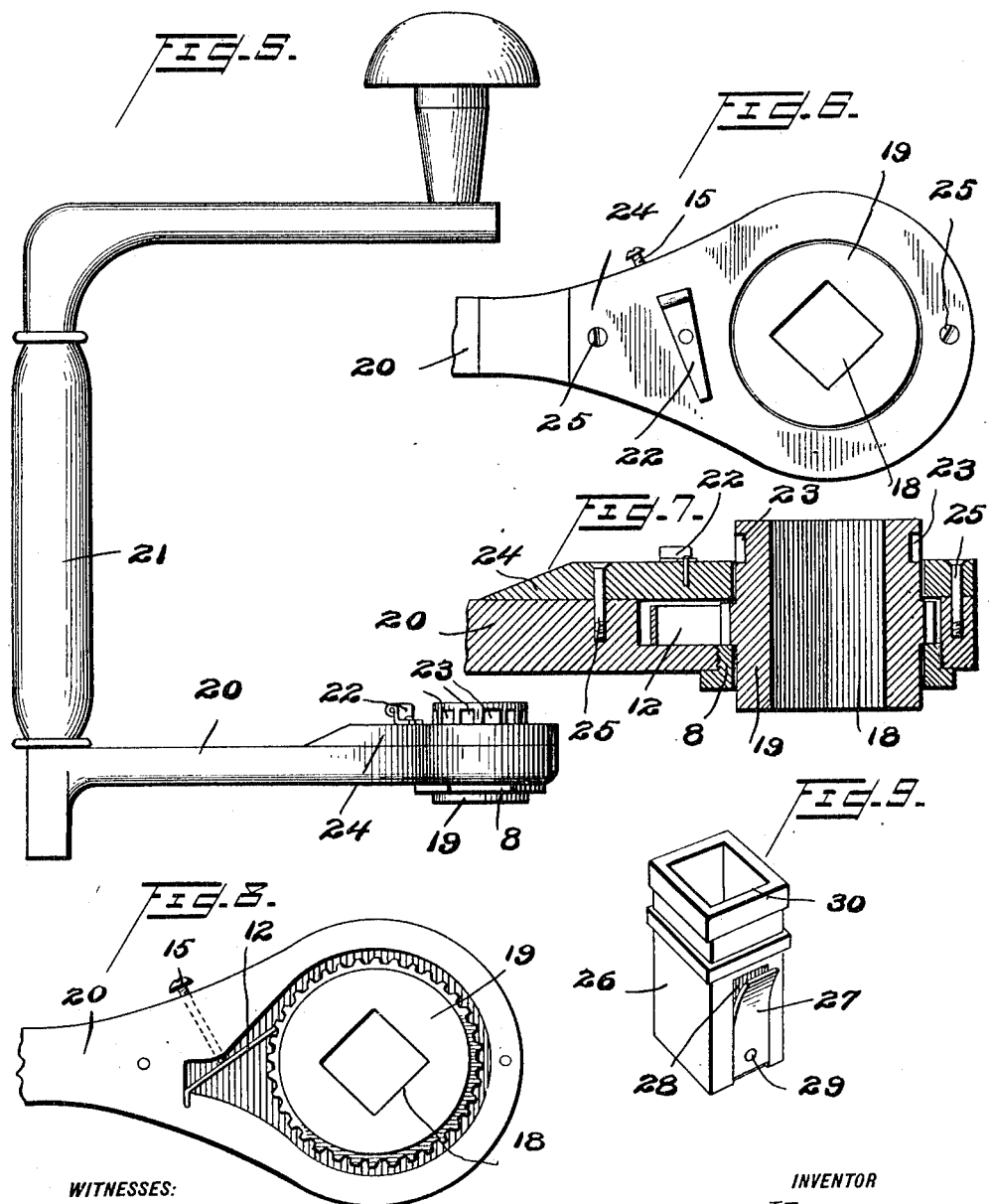

ANDREW VACAREZZA, OF VINELAND, NEW JERSEY.

RATCHET-WRENCH.

1,119,900. Specification of Letters Patent. Patented Dec. 8, 1914.

Application filed July 5, 1913. Serial No. 777,511.

*To all whom it may concern:*

Be it known that I, ANDREW VACAREZZA, a citizen of the United States, residing at Vineland, in the county of Cumberland and State of New Jersey, have invented certain new and useful Improvements in Ratchet-Wrenches, of which the following is a specification.

My invention relates to improvements in ratchet wrenches, the object of the invention being to provide an improved device of this character which can be operated to screw a nut into place or remove the same, and which, in combination with various attachments may be used on various sizes and shapes of nuts.

A further object is to provide improved means for mounting the nut engaging member within the handle or operating arm, and provide improved means for adjusting the pressure of the spring pawl against the teeth of the nut engaging member.

With these and other objects in view, the invention consists in certain novel features of construction and combinations and arrangements of parts as will be more fully hereinafter described and pointed out in the claim.

In the accompanying drawings: Figure 1 is a plan view illustrating one form of my improvements. Fig. 2 is a view in side elevation. Fig. 3 is a view in longitudinal section. Fig. 4 is a plan view with the covering plate removed. Fig. 5 is a view in elevation illustrating my improvements in connection with a brace. Fig. 6 is an enlarged plan view of the arm carrying the nut engaging member. Fig. 7 is a view in longitudinal section through the center of Fig. 6. Fig. 8 is a plan view of the arm 20 with the top plate 24 removed, and Fig. 9 is a perspective view illustrating an attachment.

My improved wrench comprises a handle 1 having a covering plate 2 removably secured thereto by screws 3, the latter projected through openings in plate 2, and screwed into threaded openings 4 in handle 1. The handle 1 and plate 2 at one end are enlarged and circular in form as clearly shown. This circular enlargement of the handle forms a chamber 5 in which a rotatable member 6 is mounted. This member 6 is of greater length than the thickness of the handle and extends through a circular opening 7 in handle 1 and through a ring 8 which is screwed into a threaded opening 9 in plate 2.

An annular series of teeth 10 are formed on member 6, said teeth located within the chamber and when the ring 8 is removed, the member 6 may be drawn through the opening 9. This ring 8 has an angular flange 11 at its outer end, so that it may be readily turned by an ordinary wrench, and as the teeth 10 are located midway between the ends of the member 6, the latter is alike at both ends, and may be placed within the device indiscriminately.

The teeth 10 are engaged by a spring pawl 12, one end of which is positioned in a recess 13 in an enlargement 14 integral with handle 1. A screw 15 projects through a threaded opening 16 in an enlargement 17 on the handle 1 and bears against the spring pawl 12 between the ends of the latter, so that by adjusting this screw 15, the spring tension of the pawl against the teeth may be regulated to suit conditions.

The member 6 has an angular opening 18 to engage a nut, and when in position on a nut the oscillation of handle 1 will cause the nut to be screwed into place or removed. By reversing the handle, the nut may be screwed either way.

In the modification of my improvements illustrated in Figs. 5 to 8 inclusive, I support my improved rotatable member 19 corresponding to member 6 in an arm 20 which constitutes a part of an ordinary brace 21. This arm 20 is provided with a ring 8 which holds the rotatable member in operative position, and the spring pawl 12 is adjusted by means of the screw 15 as in the form first described.

As the arm 20 is not reversible, it is necessary to lock the rotatable member when unscrewing a nut. To do this I provide a pivoted catch 22 which is adapted to be moved into any of a series of notches 23 in the member 19, and hold the latter against turning. This arm 20 is provided with a removable plate 24 corresponding to plate 2, and removably secured by means of screws 25.

In Fig. 9 I illustrate in perspective my improved attachment which is provided with an angular shank portion 26 adapted to be positioned in the angular opening 18.

To securely hold the attachment in the rotatable member, a spring 27 is secured in a recess 28 in shank 26. This spring is fixed at one end by means of a pin 29, but its other end is free and flares outwardly so as to firmly bind against the wall of the opening and securely hold the attachment therein. The other end of the attachment is rectangular or other shape as shown at 30, and may be made of any size and of any shape in accordance with the size and shape of the nuts on which it is to be used. By providing various attachments, the wrench may be used for any ordinary purpose.

Various other slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A wrench comprising a hollow support having a chamber at one end, a nut engaging member mounted to turn in the chamber and projecting through the support, said nut engaging member having an annular series of teeth, a spring pawl within said hollow support, secured at one end and at its free end engaging the teeth, and a screw threaded through the wall of said support and at its inner end bearing against the spring pawl between the ends of the latter, whereby the tension of said pawl may be regulated, substantially as described.

In testimony whereof I have signed my name to this specification in the presence of two subscribing witnesses.

ANDREW VACAREZZA.

Witnesses:
M. E. DITTUS,
CHAS. E. POTTS.

Copies of this patent may be obtained for five cents each, by addressing the "Commissioner of Patents, Washington, D. C."